United States Patent
Gee et al.

(10) Patent No.: US 9,146,420 B2
(45) Date of Patent: *Sep. 29, 2015

(54) LIQUID CRYSTAL DISPLAY DEVICE

(75) Inventors: Moon-Bae Gee, Paju-si (KR); Jeong-Ae Lee, Paju-si (KR); Kyung-Chan Kim, Paju-si (KR); Kyung-Hoon Lee, Seoul (KR); Kyung-Jin Yoon, Paju-si (KR); Joong-Pill Park, Paju-si (KR); Sung-Hee Cho, Seoul (KR); Hyo-Jin Noh, Seoul (KR); Kyung-Kook Jang, Daejeon-si (KR); Kyung-Seok Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 244 days.

This patent is subject to a terminal disclaimer.

(21) Appl. No.: 13/478,399

(22) Filed: May 23, 2012

(65) Prior Publication Data

US 2013/0107170 A1    May 2, 2013

(30) Foreign Application Priority Data

Oct. 28, 2011    (KR) .................. 10-2011-0110927

(51) Int. Cl.
     *G02F 1/1335*      (2006.01)
(52) U.S. Cl.
     CPC ............................ *G02F 1/13362* (2013.01)

(58) Field of Classification Search
CPC ...... G02F 1/13357; H01L 33/06; B82Y 20/00
USPC ............................................. 349/71
See application file for complete search history.

(56) References Cited

U.S. PATENT DOCUMENTS

| | | | | |
|---|---|---|---|---|
| 2007/0178615 A1* | 8/2007 | Banin et al. | .............. | 438/29 |
| 2008/0088225 A1* | 4/2008 | Weiss et al. | .............. | 313/503 |
| 2009/0180055 A1* | 7/2009 | Kim et al. | .............. | 349/69 |
| 2009/0268136 A1* | 10/2009 | Palto | .............. | 349/118 |
| 2010/0066957 A1* | 3/2010 | Miyazaki et al. | .............. | 349/112 |
| 2011/0089809 A1* | 4/2011 | Noh | .............. | 313/483 |

FOREIGN PATENT DOCUMENTS

| | | | |
|---|---|---|---|
| CN | 101701692 A | | 5/2010 |
| CN | 102043286 A | | 5/2011 |
| CN | 102044552 A | | 5/2011 |

* cited by examiner

*Primary Examiner* — Bumsuk Won
*Assistant Examiner* — Edmond Lau
(74) *Attorney, Agent, or Firm* — Birch, Stewart, Kolasch & Birch, LLP

(57) ABSTRACT

A liquid crystal display (LCD) device according to an embodiment includes a liquid crystal panel; a first polarization plate on the liquid crystal panel; a backlight unit under the liquid crystal panel; and a quantum rod sheet disposed between the liquid crystal panel and the backlight unit.

15 Claims, 7 Drawing Sheets

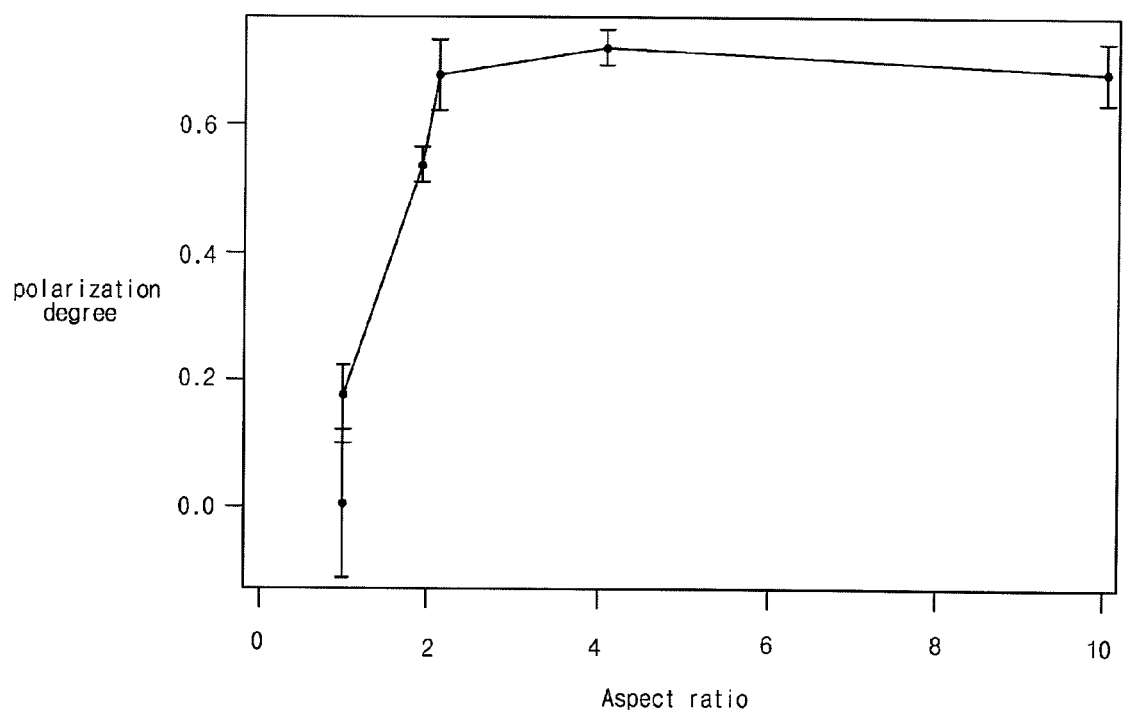

LIQUID CRYSTAL DISPLAY DEVICE

CROSS-REFERENCE TO RELATED APPLICATION

This application claims priority to and the benefit of Korean Patent Application No. 10-2011-0110927 filed in Republic of Korea on Oct. 28, 2011, which is hereby incorporated by reference.

BACKGROUND OF THE INVENTION

1. Field of the Invention

Embodiments of the invention relate to a liquid crystal display (LCD) device, and more particularly, to an LCD device having a high transmissivity.

2. Discussion of the Related Art

Recently, LCD devices have become widely used as a technology-intensive and value-added next generation device of due to its low power consumption, thin profile, and portability. Since the LCD devices including a thin film transistor (TFT) as a switching element, referred to as an active matrix LCD (AM-LCD) devices, have excellent characteristics of high resolution and display of moving images, the AM-LCD devices have come to be widely used.

In general, an LCD device is fabricated through an array process, a color filter process and a cell process. In the array process, array elements such as a TFT and a pixel electrode are formed on a first substrate. In the color filter process, color filter elements such as a color filter layer and a common electrode are formed on a second substrate. In the cell process, a liquid crystal layer is interposed between the first and second substrates.

FIG. 1 is a cross-sectional view of a related art LCD device. Referring to FIG. 1, the LCD device 1 includes a first substrate 10, a second substrate 20 and a liquid crystal layer 30 therebetween.

On the first substrate 10, a gate line and a data line are formed. The gate and data lines cross each other to define a pixel region P. A TFT Tr is formed at a crossing portion of the gate and data lines, and a pixel electrode 18, which is disposed in the pixel region P, is connected to the TFT Tr.

On the second substrate 20, a black matrix 25 including an opening, and shielding the gate line, the data line and the TFT Tr is formed. In other words, the black matrix 25 has a lattice shape. A color filter layer 26 including red, green and blue color filter patterns 26a, 26b and 26c are formed on the second substrate 20. The red, green and blue color filter patterns 26a, 26b and 26c are disposed in the opening of the black matrix 25 to correspond to the pixel region P. A common electrode 28 is formed on an entire surface over the black matrix 25 and the color filter layer 26.

The first and second substrates 10 and 20 with the liquid crystal layer 30 therebetween are combined such that the common electrode 28 faces the pixel electrode 18 to obtain a liquid crystal panel 40. A seal pattern for preventing a leakage of the liquid crystal layer 30 is formed at edges of the first and second substrates 10 and 20. In addition, first and second alignment layers for determining an initial arrangement of the liquid crystal molecules of the liquid crystal layer 30 are formed.

First and second polarization plates 50 and 52 are formed at outer sides of the liquid crystal panel 40, respectively. Namely, the first polarization plate 50 is formed at an outer side of the first substrate 10, and the second polarization plate 52 is formed at an outer side of the second substrate 20. A backlight unit BLU for providing light toward the first substrate 10 is disposed under the first polarization plate 50.

Accordingly, when a signal of the data line is provided into the pixel electrode 18 through the turned-on TFT Tr, an electric field is generated between the pixel electrode 18 and the common electrode 28. The liquid crystal molecules are driven by the electric field, and the transmissivity of light from the backlight unit BLU is changed such that images are displayed.

As mentioned above, the first and second polarization plates 50 and 52, which are disposed at the outer sides of the liquid crystal panel 40, have perpendicular transmittance axes. The light from the backlight unit BLU is polarized into a first linearly-polarized light by the first polarization plate 50, and the first polarization light is changed into a second linearly-polarization light by the liquid crystal layer 30. The second linearly-polarized light passes through the second polarization plate 52 such that the light is incident to eyes of the user.

However, the light incident to the eyes of the user is about 5 to 6% of the light from the backlight unit of the LCD device 1. Namely, a light efficiency of the LCD device 1 is very low.

FIG. 2 shows polarization conditions of lights from the backlight unit and the first polarization plate in the related art LCD device. Referring to FIG. 2, in the related art LCD device, the light is emitted from the backlight unit BLU and passes through the first polarization plate 50. Since the backlight unit BLE emits a non-polarized light, about 50% light of the non-polarized light can be transmitted through the second polarization plate 50, which has a transmission axis to only transmit light parallel to the transmission axis. As a result, a transmissivity is reduced through the first polarization plate 50 by about 50%.

Accordingly, the light incident to the eyes of the user is about 5 to 6% of the light from the backlight unit of the LCD device 1. As a result, the LCD device requires high power consumption to produce a predetermined brightness.

SUMMARY OF THE INVENTION

Accordingly, embodiments of the invention are directed to an LCD device that substantially obviates one or more of the problems due to limitations and disadvantages of the related art, and have other advantages.

An object of the invention is to provide an LCD device having high transmissivity and low power consumption.

According to an embodiment of the invention, a liquid crystal display (LCD) device includes a liquid crystal panel; a first polarization plate on the liquid crystal panel; a backlight unit under the liquid crystal panel; and a quantum rod sheet disposed between the liquid crystal panel and the backlight unit.

According to an embodiment of the invention, a quantum rod sheet for use in a liquid crystal device, the quantum rod sheet includes a plurality of quantum rods arranged along a direction, each quantum rod including a core or a core and a shell.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are examples and are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a graph showing polarization degree according to variation of a ratio of a minor axis to a minor axis of a quantum rod in the quantum rod sheet for an LCD device according to an embodiment of the invention.

DETAILED DESCRIPTION OF THE EMBODIMENTS

Reference will now be made in detail to embodiments of the invention, examples of which are illustrated in the accompanying drawings.

Figure 1:
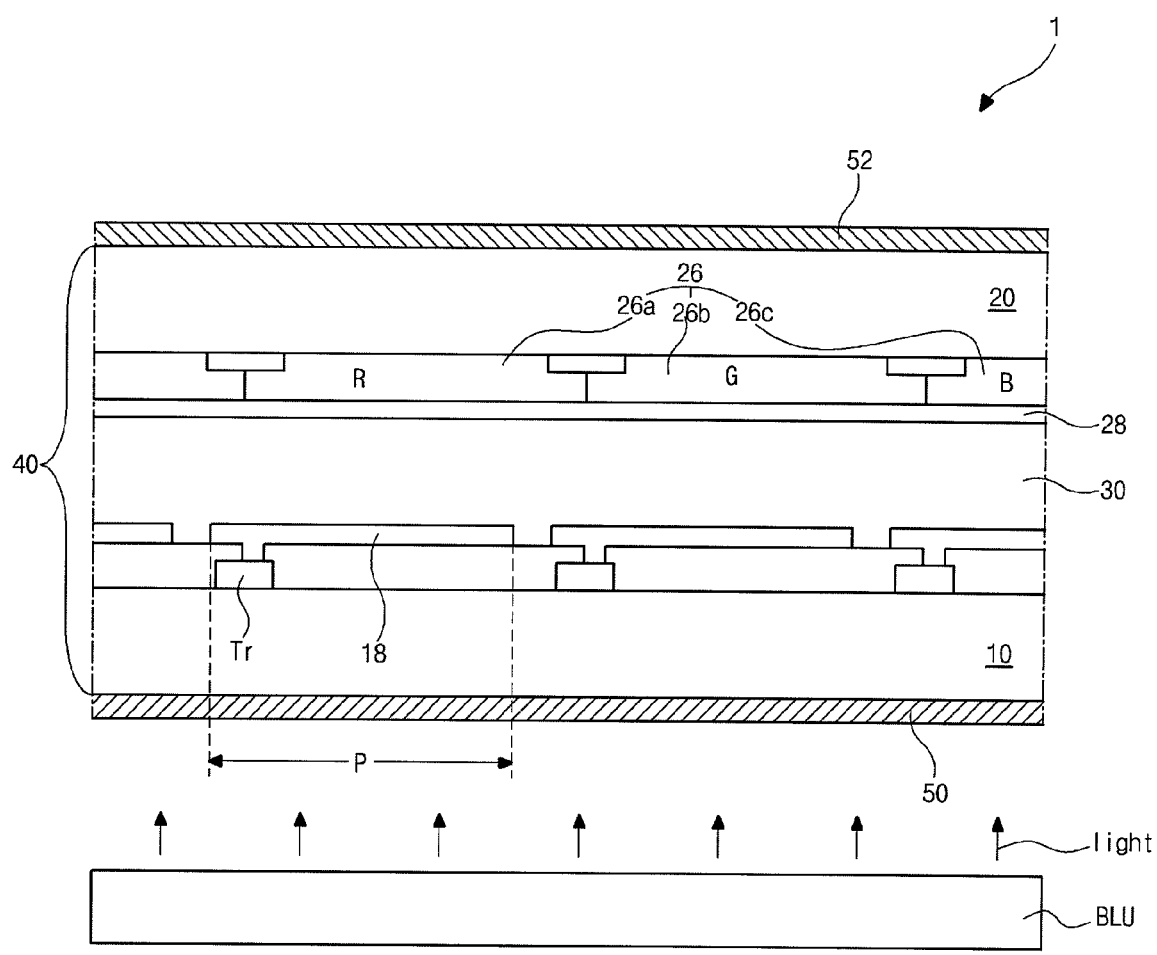
FIG. 1 is a cross-sectional view of a related art LCD device.
Figure 2:
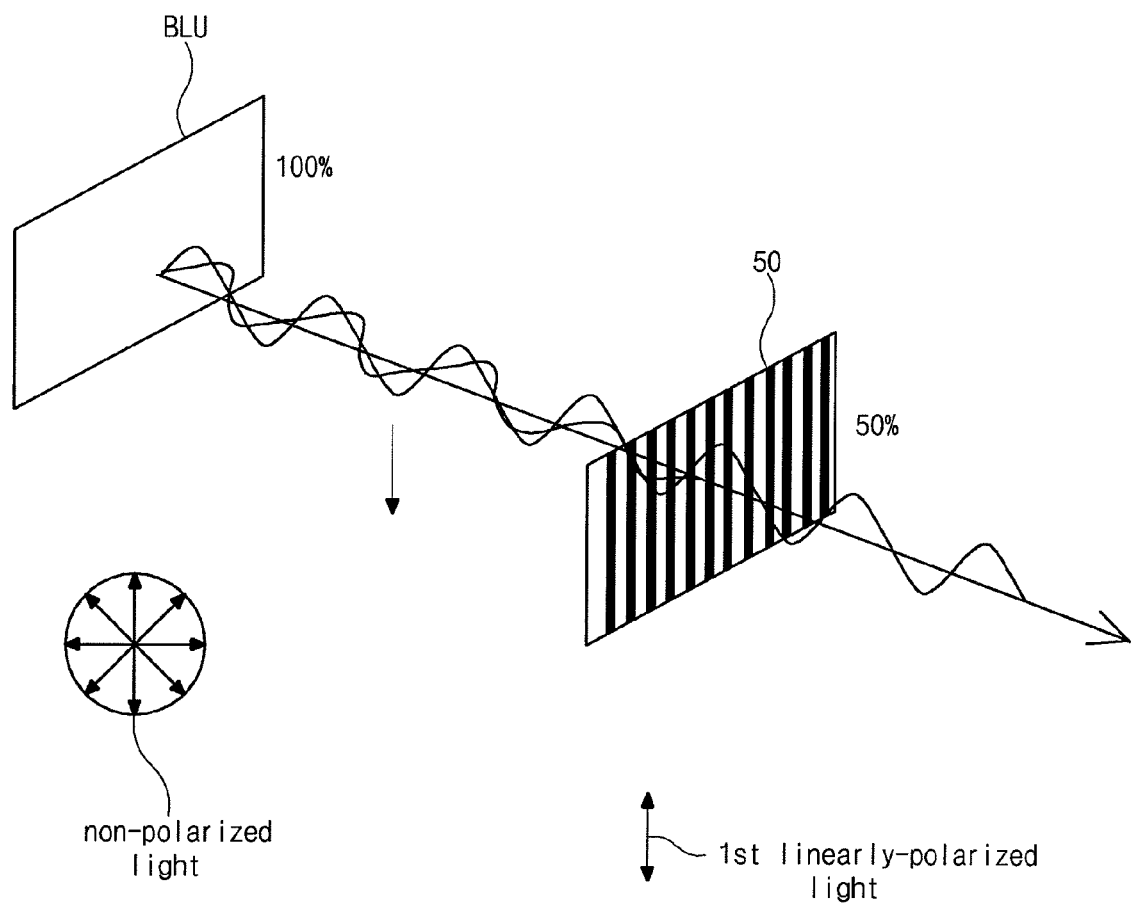
FIG. 2 shows polarization conditions of lights from a backlight unit and a first polarization plate in the related art LCD device of FIG. 1.
Figure 3:
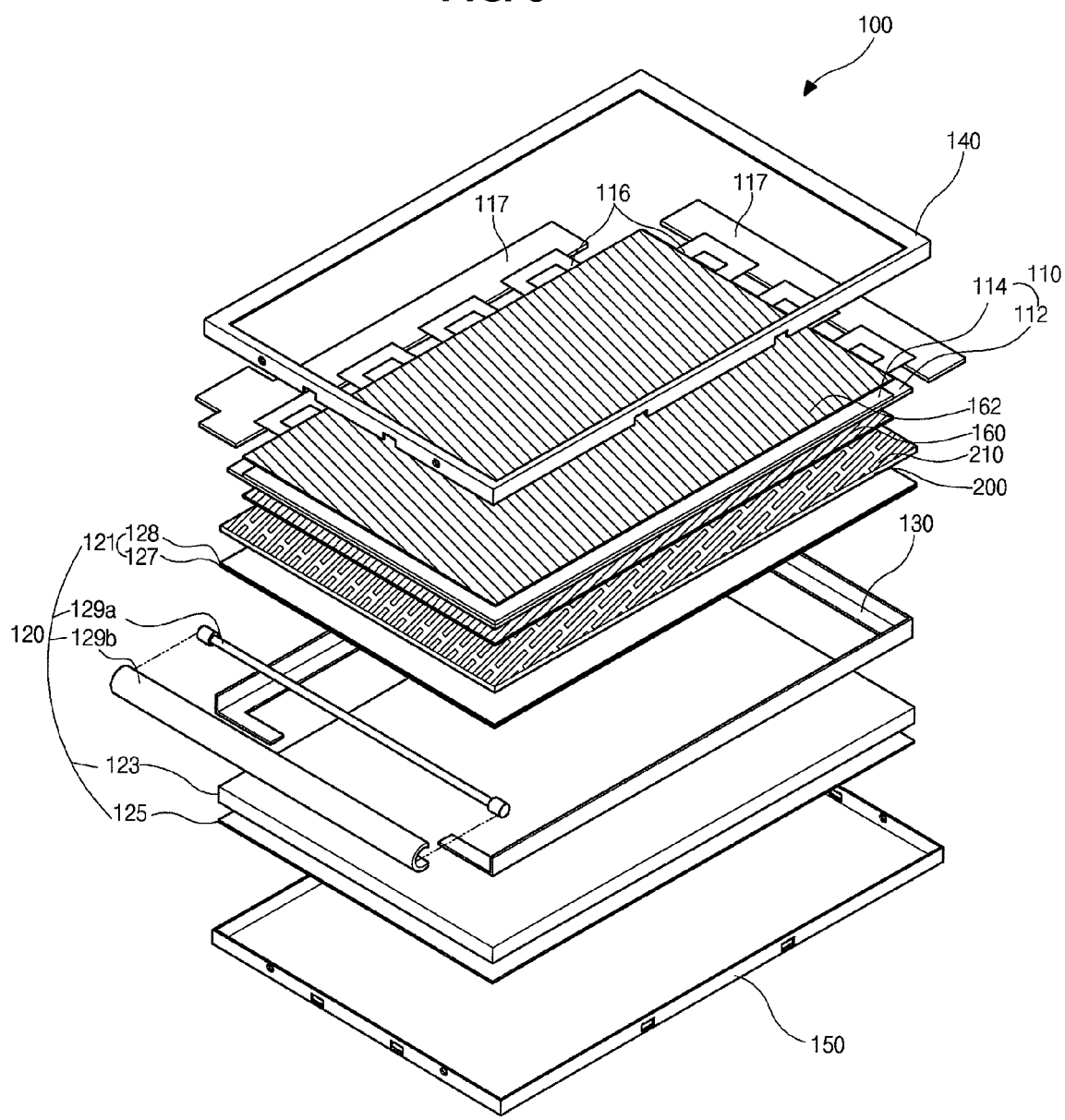
FIG. 3 is an exploded perspective view of an LCD device according to an embodiment of the invention.

FIG. 3 is an exploded perspective view of an LCD device according to an embodiment of the invention.

As shown in FIG. 3, an LCD device 100 includes a liquid crystal panel 110, a backlight unit 120, a quantum rod sheet 200, a main frame 130, a top frame 140 and a bottom frame 150. The main frame 130 covers the sides of the liquid crystal panel 110, and the top frame 140 covers the front edges of the liquid crystal panel 110. The bottom frame 150 covers the rear side of the backlight unit 120.

The liquid crystal panel 110 includes first and second substrates 112 and 114 facing each other, and a liquid crystal layer 330 therebetween.

On the first substrate 112, a gate line and a data line are formed. The gate and data lines cross each other to define a pixel region. A TFT is formed at a crossing portion of the gate and data lines and connected to the gate and data lines. A pixel electrode, which is disposed in the pixel region, is connected to the TFT.

On the second substrate 114, a black matrix (not shown) including an opening and shielding the gate line, the data line and the TFT Tr is formed. In other words, the black matrix has a lattice shape. A color filter layer (not shown) including red, green and blue color filter patterns are formed on the second substrate 114. The red, green and blue color filter patterns are disposed in the opening of the black matrix to correspond to the pixel region. A common electrode is formed on an entire surface over the black matrix and the color filter layer.

In the above-mentioned structure, the pixel electrode is formed on the first substrate 112 and the common electrode is formed on the second substrate 114 such that a vertical electric field is generated between the pixel and common electrodes. Alternatively, the pixel electrode and the common electrode may be alternately arranged with each other on the first substrate 112 such that a horizontal electric field is generated therebetween. Alternatively, the color filter layer may be formed on the first substrate 112. Such a structure may be referred to as a color filter on TFT (COT) structure.

A printed circuit board 117 is connected to at least one side of the liquid crystal panel 110 via a connection means 116. The printed circuit board 117 may closely extend along a side surface of the main frame 130 or a rear surface of a bottom frame 150 in a modularization process.

When the TFT Tr is turned on by a scanning signal from a gate line, an image signal is applied to the pixel electrode through the data line. Then, the liquid crystal molecules in the liquid crystal layer between the first and second substrates 112 and 114 are driven by an electric field generated between the pixel and common electrodes. As a result, light transmissivity of the liquid crystal layer is controlled such that the LCD device 100 can produce an image.

First and second polarization plates 160 and 162 are disposed at outer sides of the liquid crystal panel 110, respectively. Polarized light extending in a direction is transmitted through the first polarization plates 160 or the second polarization plate 162. Namely, a first polarization axis of the first polarization plate 160 is substantially perpendicular to a second transmission axis of the second polarization plate 162.

Although not shown, an alignment layer for determining an initial arrangement of liquid crystal molecules may be disposed between the first substrate 112 and the liquid crystal layer, and between the second substrate 114 and the liquid crystal layer. In addition, a seal pattern preventing leakage of liquid crystal molecules is formed along an edge of one of the first and second substrates 112 and 114.

The backlight unit 120 for providing light onto the liquid crystal panel 110 is disposed under the liquid crystal panel 110. The backlight unit 120 includes a light source 129a, a reflective sheet 125, a light guide plate 123 and an optical sheet 121. The light guide plate 123 is disposed on the reflective sheet 125, and the optical sheet 121 is disposed on the light guide plate 123.

For example, the light source 129a may include one of a fluorescent lamp, such as a cold cathode fluorescent lamp (CCFL) and an external electrode fluorescent lamp (EEFL), and a light emitting diode (LED). FIG. 3 shows the light source 129a including the fluorescent lamp. The light source 129a is disposed at one side of the light guide plate 123 and is covered with a lamp guide 129b.

The light from the light source 129a is processed into a plane light source during passage through the light guide plate 123 by a total reflection. The light guide plate 123 may have a pattern for guiding the light to the liquid crystal panel 110 and providing a uniform plane light source. For example, the pattern may be an elliptical pattern, a polygon pattern, and a hologram pattern, and may be formed at a bottom surface of the light guide plate 123.

The reflective sheet 125 is disposed under the light guide plate 123. The light is reflected on the reflective sheet to improve an optical efficiency. The optical sheet 121 on or over the light guide plate 123 includes a diffusion sheet and at least one concentrating sheet. The light, which passes through the light guide plate 123, is diffused and/or concentrated such that a uniform plane light is provided onto the liquid crystal panel 110.

FIG. 3 shows the light source 129a disposed at one side of the light guide plate 123. This arrangement may be referred to as a side light type. Alternatively, the light source may be arranged on the reflective sheet without the light guide plate and with a diffusion sheet over the light source. This arrangement may be referred to as to a direct light type.

In an embodiment of the invention, the LCD device 100 includes the quantum rod sheet 200 between the liquid crystal panel 110 and the backlight unit 120. The quantum rod sheet 200 includes a plurality of quantum rods 210 arranged along a direction.

The quantum rod sheet 200 may further include an auxiliary emitting material. For example, the auxiliary emitting material may include at least one of a quantum dot, an inorganic fluorescent substance and an organic fluorescent substance. In this instance, a weight ratio of the quantum rod 210 and the auxiliary emitting material may be about 99:1 to 50:50. Namely, the weight % of the quantum rod 210 is larger than or equal to that of the auxiliary emitting material. If the weight % of the auxiliary emitting material is larger than that of the quantum rod 210, a polarization property of the quantum rod sheet 200 is degraded.

Figure 4:
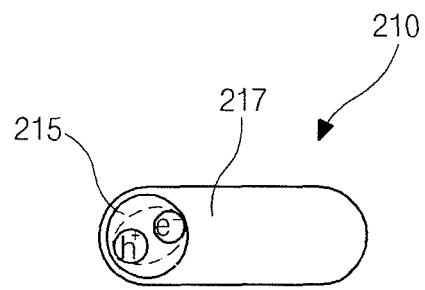
FIG. 4 shows a quantum rod of a quantum rod sheet for an LCD device according to an embodiment of the invention.

Referring to FIG. 4 showing a quantum rod of a quantum rod sheet for an LCD device according to an embodiment of the invention, the quantum rod 210 includes a core 215 and a shell 217 surrounding the core 215. The core 215 has one of a sphere shape, an elliptical sphere shape, a polyhedron shape and a rod shape. Other shapes may be used for the core 215. FIG. 4 shows a sphere shape core 215. The shell 217 has a rod shape having a major axis and a minor axis. A cross section along the minor axis of the shell 217 has one of a circle shape, an ellipse shape and a polyhedron shape. The shell 217 may have other shapes. The shell 217 has a single-layered structure or a multi-layered structure and is formed of one or more semiconductor materials, an alloy thereof, an oxide material and/or an impurity-doped material. A ratio of the minor axis of the shell 217 to the major axis of the shell 217 is about 1:1.1 to 1:30. Reference to an alloy includes compound semiconductors.

Alternatively, the quantum rod 210 may include the core 215 without a shell. The core 215 may have one of an elliptical sphere shape, and a rod shape. Other shapes may also be used.

The core 215 of the quantum rod 210 includes a semiconductor material or an alloy of materials of groups II-VI, III-V, III-VI, VI-IV and IV in the periodic table or their mixture. For example, the core 215 of the quantum rod 210 may include at least one of CdSe, CdS, CdTe, ZnO, ZnSe, ZnS, ZnTe, HgSe, HgTe, CdZnSe, InP, InN, GaN, InSb, InAsP, InGaAs, GaAs, GaP, GaSb, AlP, AlN, AlAs, AlSb, CdSeTe, ZnCdSe, PbSe, PbTe, PbS, PbSnTe, and $Tl_2SnTe_5$.

Even if the cores 215 are formed of the same material, a fluorescent wave length of the light from the quantum rod 210 is varied depending on a size of the core 215. The smaller size the core 215 has, the smaller wave length of the light is. By controlling the size of the core 215, lights in the visible range can be emitted.

Referring again to FIG. 3, the quantum rod 210 absorbs the light from the backlight unit 120 and emits light. Since the internal quantum yield of the quantum rod 210 is about 100%, the light emitted from the quantum rod 210 has substantially the same brightness as the light from the backlight unit 120.

In the quantum rod sheet 200 including the quantum rods 210, the quantum rods 210 are arranged along a surface of the first and second substrates 112 and 114 of the liquid crystal panel 110. In addition, the major axes of the quantum rods 210 are arranged to be parallel to the transmission axis of the first polarization plate 160.

The quantum rods 210 are arranged on a transparent substrate by one of a voltage applying method, an aligning method using an alignment layer, an aligning method using a self-aligned monomer, and an aligning method using a reactive mesogen material. The aligning method for the quantum rods 210 is not limited to the above methods.

Figure 5:
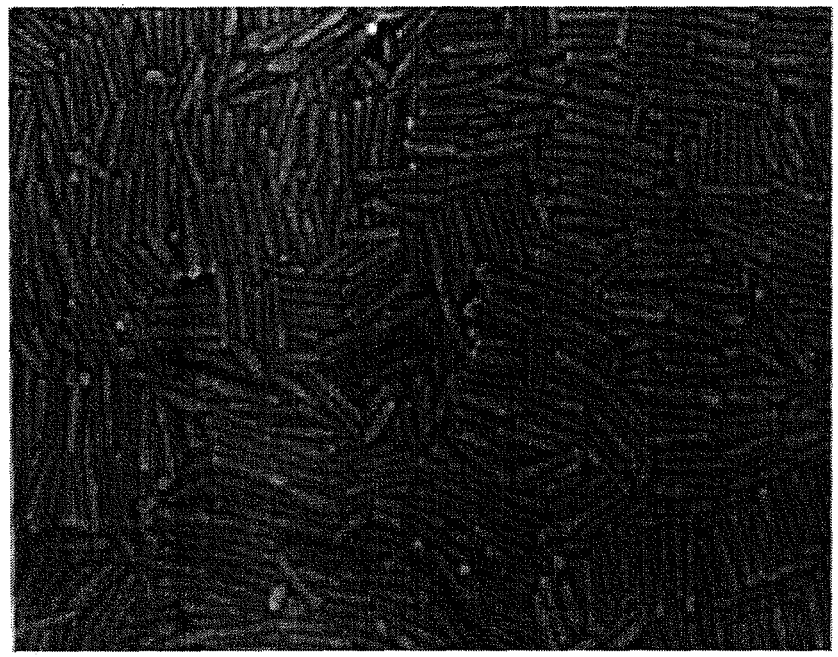
FIG. 5 is a picture of a quantum rod sheet including randomly arranged quantum rods.
Figure 6:
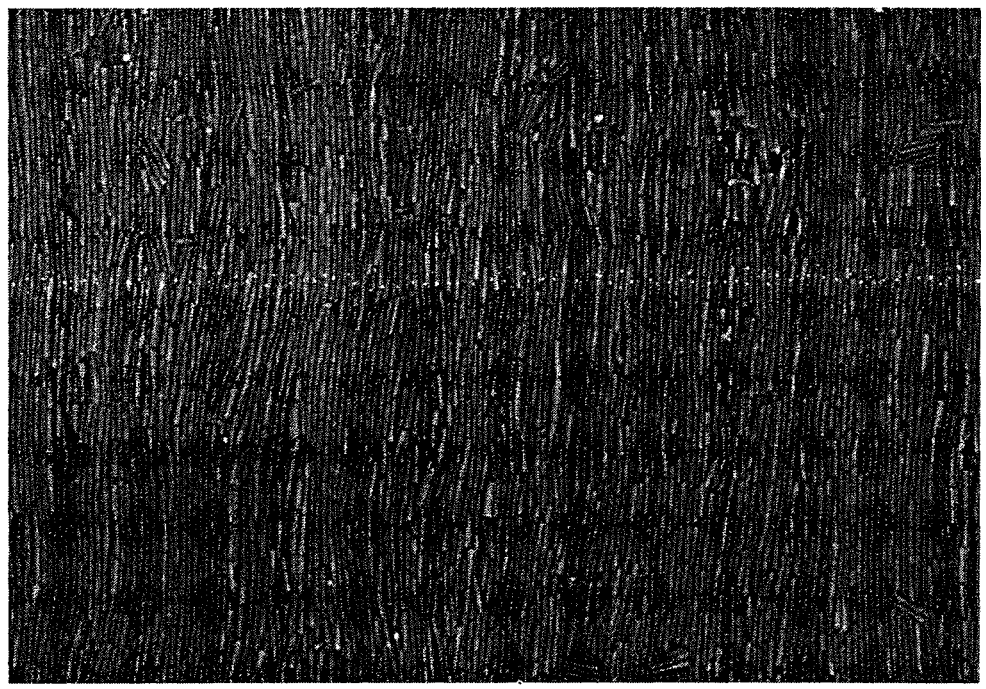
FIG. 6 is a picture of a quantum rod sheet including arranged quantum rods.

FIG. 5 is a picture of a quantum rod sheet including randomly arranged quantum rods, and FIG. 6 is a picture of a quantum rod sheet including arranged quantum rods.

Referring to FIG. 5, the quantum rods are randomly arranged. For example, groups of quantum rods 210 may present, whereby the groups of quantum rods 210 are aligned in different directions. For example, one group of the quantum rods 210 may be arranged in a first direction, while an adjacent group of the quantum rods 210 may be arranged in a direction perpendicular to the first direction. Yet another adjacent group of the quantum rods 210 may be arranged in a third direction is neither parallel nor perpendicular to the first direction. On the contrary, referring to FIG. 6, the quantum rods are arranged by at least one the above mentioned arranging method to be parallel to a direction. The aligning accuracy is measured by a polarization ratio. The polarization ratio of the quantum rod sheet can be measured by detecting light amount passing through an analyzer after irradiating horizontally or vertically polarized light toward the quantum rod sheet.

When light intensity from the light source is defined as "I", horizontally-polarized light intensity through the quantum rod sheet is defined as "Ih", and vertically-polarized light intensity through the quantum rod sheet is defined as "Iv", the polarization ratio "PR" of the unarranged quantum rod sheet is defined as:

$PR=(Ih-Iv)(Ih+Iv)$.

When the quantum rods are arranged along a horizontal direction or a vertical direction, a horizontal direction polarization ratio "PRh" and a vertical direction polarization ratio "PRv" are respectively defined as:

$PRh=Ih/(Ih+Iv)$ and $PRv=Iv/(Ih+Iv)$.

The quantum rods 210 in the quantum rod sheet 200 in embodiments of the invention are arranged along a direction, and the horizontal direction polarization ratio "PRh" or the vertical direction polarization ratio "PRv" is larger than about 0.5 and equal to or smaller than 1, i.e., (0.5<PRh or PRv≤1).

When major axes of the quantum rods 210 are arranged along a direction, the quantum rods 210 absorbing the light from the backlight unit 120 emits the light being polarized along the direction. Namely, the light emitted from the quantum rod sheet 200 including the quantum rods 210 has a linearly-polarized condition along the major axis direction of the quantum rods 210. For example, the quantum rods 210 may absorb a UV ray, which has a wave length smaller than 450 nm, and emits the polarized light. The polarization property of the quantum rods sheet 200 may depend on the ratio of the minor axis to the major axis of the quantum rod 210.

Figure 7:
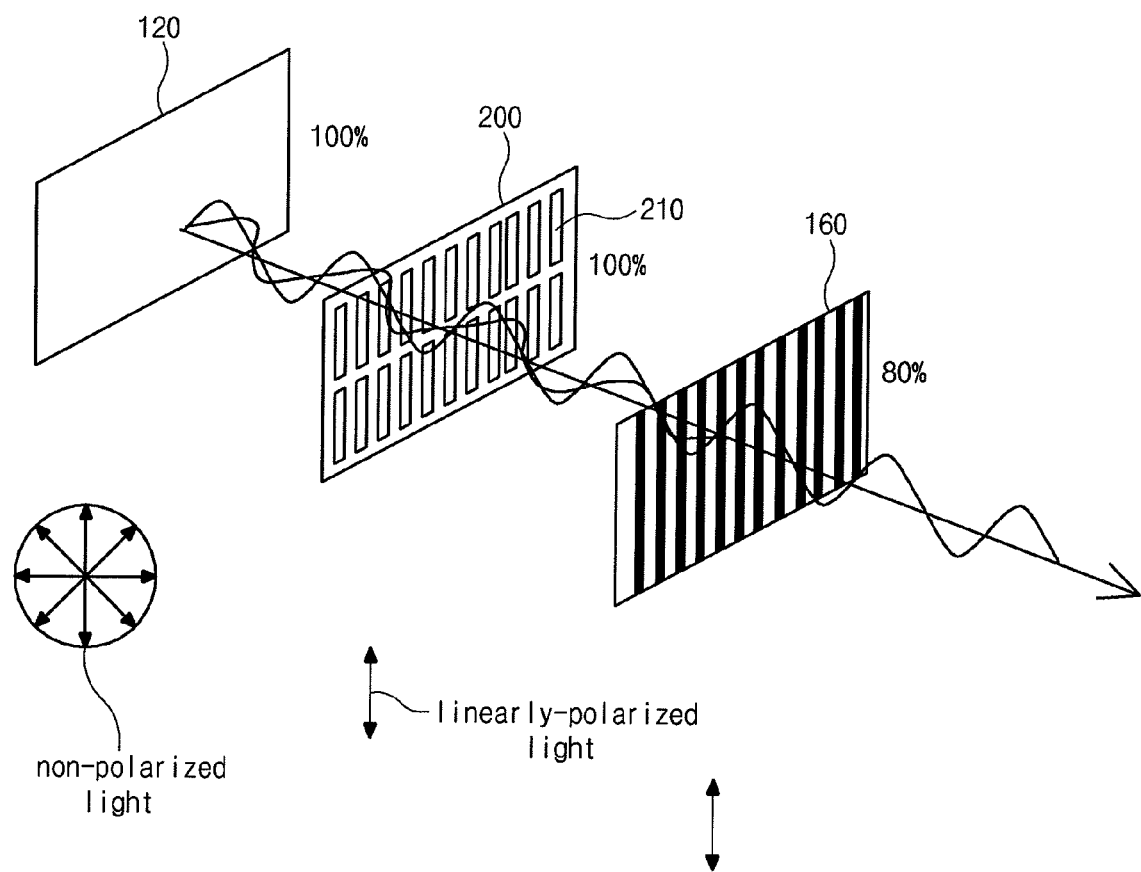
FIG. 7 shows polarization conditions of lights from a backlight unit, a quantum rod sheet and a first polarization plate in an LCD device according to an embodiment of the invention.

FIG. 7 shows polarization conditions of lights from a backlight unit, a quantum rod sheet and a first polarization plate in an LCD device according to an embodiment of the invention. With use of LCD device of FIG. 3, whereby the non-polarized light is emitted from the backlight unit 120. Since the quantum rod 210 in the quantum rod sheet 200 has an internal quantum yield of about 100%, the light emitted from the quantum rod 210 has substantially the same brightness as the light from the backlight unit 120. Accordingly, when the major axes of the quantum rods 210 are arranged to be parallel to the transmission axis of the first polarization plate 160, about 50 to 90% of the light from the backlight unit 120 can be passed through the first polarization plate 160 depending on an align accuracy of the major axes of the quantum rods 210 and a ratio of the minor axis to the major axis of the quantum rod 210.

FIG. 8 is a graph showing polarization degree according to variation of a ratio of a minor axis to a minor axis of a quantum rod in the quantum rod sheet for an LCD device according to an embodiment of the invention. In FIG. 8, "aspect ratio" means a ratio of a minor axis of the quantum rod to a major axis of the quantum rod.

As shown in FIG. 8, with comparison to the aspect ratio of 1, when the aspect ratio is changed into 2, the polarization degree becomes about 70%.

Referring to FIGS. 3 and 7, assuming the light emitted from the backlight unit 120 is 100%, since the quantum rod sheet including the quantum rod having an aspect ratio of 2 emits the light, which is polarized to be perpendicular to the transmission axis of the first polarization plate, having a ratio of 1 and the light, which is polarized to be parallel to the transmission axis of the first polarization plate, having a ratio of 5.5, the LCD device 100 including the quantum rod sheet 200 has about 30% improved transmittance with comparison to the related art LCD device where non-polarized light is incident to the first polarization plate.

Namely, the non-polarized light has 50% transmittance through the first polarization plate, while the polarized light from the quantum rod sheet, which has an aspect ratio of 2, has 83% transmittance through the first polarization plate. As a result, the LCD device according to the embodiment of the present invention has larger transmittance than the related art LCD device.

The liquid crystal panel 110, the backlight unit 120 and the quantum rod sheet 200 therebetween are modularized with the main frame 130, the top frame 140 and the bottom frame 150. The top frame 140 covers edges of a front surface of the liquid crystal panel 110 and side surfaces of the liquid crystal panel 110. The top frame 140 has an opening such that images from the liquid crystal panel 110 can be displayed through the opening of the top frame 140. The bottom frame 150 includes a bottom surface and four side surfaces to cover a rear surface of the backlight unit 120 and side surfaces of the backlight unit 120. The bottom frame 150 covers a rear side of the backlight unit 120. The main frame 130 has a rectangular frame shape. The main frame 130 covers side surfaces of the liquid crystal panel 110, the backlight unit 120, the first and second polarization plates 160 and 162 and the quantum rod sheet 200, and is combined with the top frame 140 and the bottom frame 150. The top frame 140 may be referred to as a top case or a case top, and the main frame 130 may be referred to as a guide panel, a main support or a mold frame. The bottom frame 150 may be referred to as a bottom cover or a lower cover.

Although not shown, the backlight unit 120 may further include a function film or element to change the light from the light source 129*a* into a polarized light. In this instance, the polarized light is incident to the quantum rod sheet 200 such that the transmittance of the LCD device is further improved.

In embodiments of the invention, since the LCD device 100 includes the quantum rod sheet 200, where the quantum rods 210 are arranged along a direction, between the backlight unit 120 and the liquid crystal panel 110, the transmittance of the light from the backlight unit through the first polarized plate 160 is increased such that brightness or transmissivity of the LCD device 100 according to embodiments of the invention is improved with a range of about 33% with respect to the related art LCD device. In other words, when the same brightness is produced, power consumption of the LCD device according to embodiments of the invention is lower than that of the related art LCD device.

FIG. 3 shows the first and second polarization plates 160 and 162, which are respectively disposed at outer sides of the liquid crystal panel 110, and the quantum rod sheet 200 between the first polarization plate 160 and the backlight unit 120. Alternatively, the quantum rod sheet 200 may be disposed directly under the liquid crystal panel 110 without the first polarization plate 160. When the quantum rod 210 has a polarization ratio, which is a ratio of the polarized light parallel to the major axis of the quantum rod to the polarized light parallel to the minor axis of the quantum rod, of 1:10 by accurately arranging the quantum rod 210 along a direction, a first linearly-polarized light can be provided into the liquid crystal panel 110 by the quantum rod sheet 200 without the first polarization plate 160. In other words, the first polarization plate 160 can be omitted. In this instance, a direction of the quantum rod 210 is perpendicular to the transmission axis of the second polarization plate 162.

The above-mentioned LCD device has an improved transmissivity with a range of about 50% with comparison to the related art LCD device including both the first and second polarization plates. In other words, when the same brightness is produced, power consumption of the LCD device according to embodiments of the invention is lower than that of the related art LCD device. In addition, a thin profile and light weight LCD device can be obtained without the first polarization plate.

It will be apparent to those skilled in the art that various modifications and variations can be made in the embodiments of the invention without departing from the spirit or scope of the invention. Thus, it is intended that the modifications and variations cover this invention provided they come within the scope of the appended claims and their equivalents.

What is claimed is:

1. A liquid crystal display (LCD) device comprising:
   a liquid crystal panel;
   a first polarization plate on the liquid crystal panel;
   a backlight unit under the liquid crystal panel;
   a second polarization plate between the liquid crystal panel and the backlight unit; and
   a quantum rod sheet disposed between the second polarization plate and the backlight unit and including a plurality of quantum rods,
   wherein a major axis of the plurality of quantum rods is arranged along a first direction, which is substantially perpendicular to a first transmission axis of the first polarization plate and is substantially parallel to a second transmission axis of the second polarization plate, such that the quantum rod sheet receives non-polarized light from the backlight unit and emits linearly-polarized light along the first direction.

2. The device of claim 1, wherein each quantum rod includes one of a core, or a core and a shell.

3. The device of claim 2, wherein, when each of the quantum rods includes only the core, the core is a rod shape, and when each of the quantum rods includes the core and the shell, the shell is the rod shape.

4. The device of claim 2, wherein the shell is formed of at least one of a semiconductor material, an alloy of semiconductor materials, an oxide material and an impurity-doped material.

5. The device of claim 2, wherein the core of the quantum rod includes one or more semiconductor materials or an alloy of the semiconductor materials.

6. The device of claim 5, wherein the semiconductor materials is at least one of CdSe, CdS, CdTe, ZnO, ZnSe, ZnS, ZnTe, HgSe, HgTe, CdZnSe, InP, InN, GaN, InSb, InAsP, InGaAs, GaAs, GaP, GaSb, AlP, AN, AlAs, AlSb, CdSeTe, ZnCdSe, PbSe, PbTe, PbS, PbSnTe, and $Tl_2SnTe_5$.

7. The device of claim 1, wherein the quantum rod sheet further includes an auxiliary emitting material.

8. The device of claim 7, wherein the auxiliary emitting material includes at least one of a quantum dot, an inorganic fluorescent substance and an organic fluorescent substance.

9. The device of claim 7, wherein a weight ratio of the quantum rod and the auxiliary emitting material may be about 99:1 to 50:50, and a weight % of the quantum rod is larger than or equal to a weight % of the auxiliary emitting material.

10. The device of claim 1, wherein each quantum rod has a minor axis and a major axis, and a ratio of the minor axis to the major axis of the shell is about 1:1.1 to 1:30.

11. The device of claim 1, wherein the backlight unit includes a light source, a reflective sheet and an optical sheet.

12. The device of claim 11, wherein the backlight unit further includes a functional film or element for changing light from the light source into polarized light along the first direction.

13. The device of claim 11, wherein the backlight unit further includes a light guide plate, wherein the light guide plate is disposed on the reflective sheet and under the liquid crystal panel, and the light source is disposed at a side of the light guide plate.

14. The device of claim 11, wherein the light source is disposed under the liquid crystal panel and on the reflective sheet.

15. The device of claim 11, wherein the light source includes one of a cold cathode fluorescent lamp, an external electrode fluorescent lamp and a light emitting diode.

* * * * *